Patented Oct. 9, 1928.

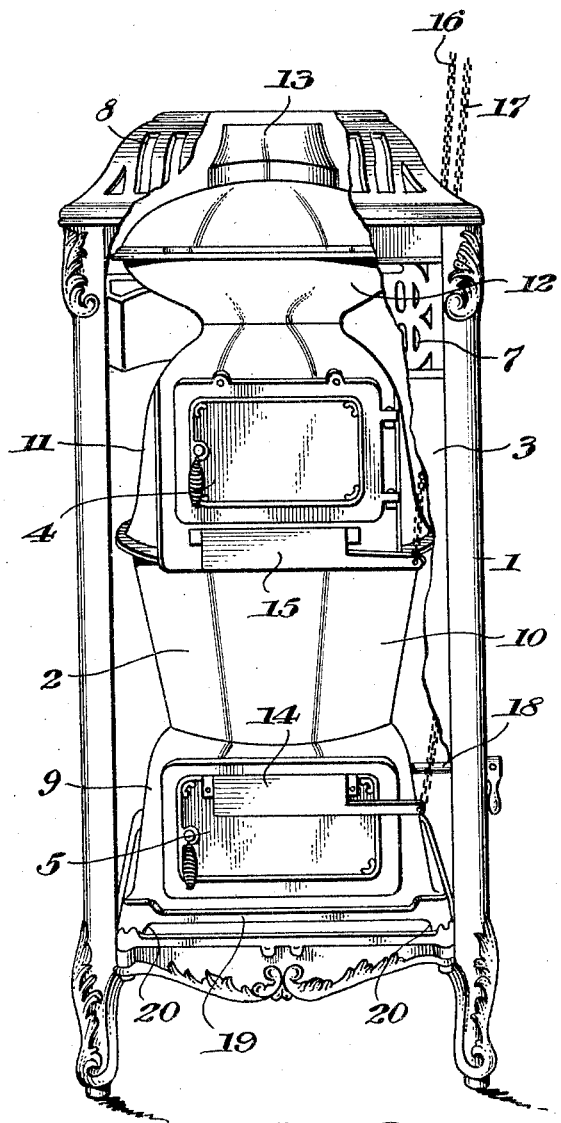

1,687,430

UNITED STATES PATENT OFFICE.

EDWIN F. DIEKMANN, OF EVANSVILLE, INDIANA, ASSIGNOR TO CRESCENT STOVE WORKS, A CORPORATION.

HEATING STOVE.

Application filed January 24, 1925. Serial No. 4,462.

The invention relates to heating stoves of that general class embodying a stove or heater contained within, and concealed by, an outer casing or shell having the appearance of a cabinet such, for instance, as that containing a phonograph.

The objects of the invention are to provide: a stove or heater of this class wherein the shell, when closed, discloses no features or parts indicating that the cabinet contains a stove or heater; a stove or heater which is arranged within the cabinet-like shell in such manner that circulation of air and heat is obtained on all four sides, an increase of twenty-five per cent greater circulation over other stoves or heaters of this class of which I have knowledge; combining the heater or stove and the shell in an improved manner whereby the stove or heater may be readily assembled within the shell and supported by the latter and, when in position, will be so arranged in relation to the shell that by merely opening one or more doors provided in the shell, the fire box door and ash pit door, dampers, and other parts of the stove will be made accessible and when the door or doors are closed the appearance of the heater as a cabinet, will be resumed.

My invention entirely eliminates fire and ash doors on the outer shell or cabinet and thus relieves this class of stove or heater of the objection, heretofore obtaining, that the cabinet can at once be recognized as containing a heater.

A practical embodiment of the invention is shown in the accompanying drawings, in which:

Fig. 2 is a front elevation, the doors being omitted and front of the cabinet broken away; and Fig. 3 is a detail view of the lower left-hand front corner of the heater, parts being broken away.

Figure 1:
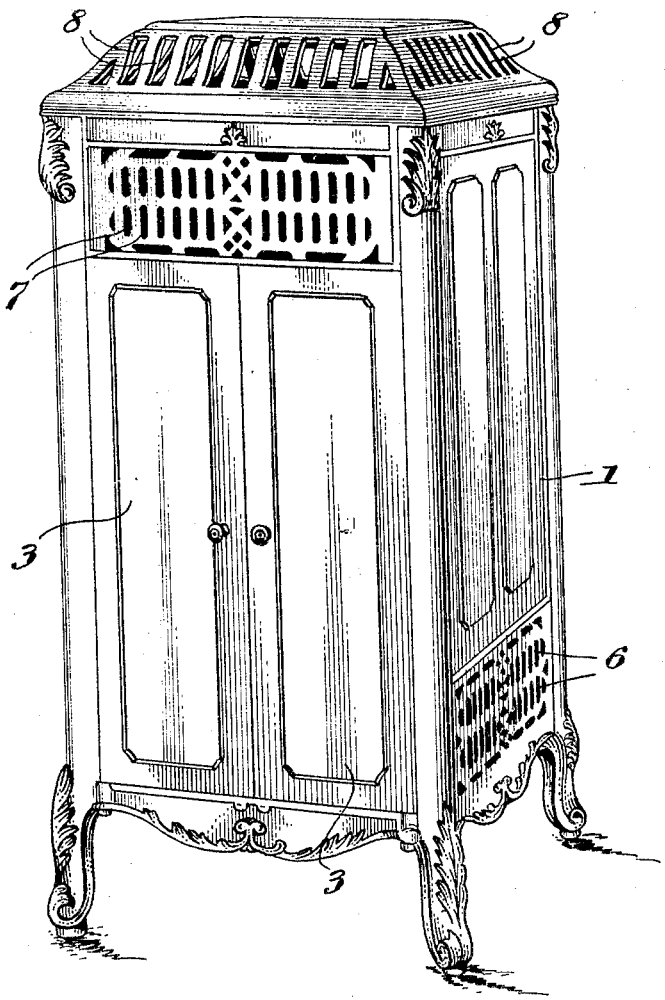
Figure 1 is a perspective view of the stove or heater, the cabinet being closed.

The heater or stove comprises, mainly, the outer shell or cabinet 1 and the stove or heater 2 which is contained within, and supported by, the shell 1.

The cabinet or shell 1 is preferably of pleasing shape or appearance, an object which is sought in this general class of heater.

Unlike the shells or cabinets of heaters heretofore known to the art, the cabinet 1 is devoid of any parts which indicate that a stove or heater is contained therein. Heretofore ash doors, fire doors, and other parts of the stove having utility have constituted a part of the enclosing cabinet or shell and have detracted from the appearance of the heater.

In my invention the cabinet 1 is preferably in the form of a phonograph cabinet of attractive outline and ornamentation but, aside from this, I dispense with the necessity of having ash doors, fire doors, and other heater parts exhibited by providing the cabinet with one or more doors 3 which, when closed, completely cover the stove or heater 2 and the fire door 4 and ash door 5 thereof. When the door or doors 3 are opened, the entire front of the heater 2 is exposed so that fuel may be introduced into the stove 2, ashes removed, and other necessary attention given the heater.

At the lower part of the sides of the shell or cabinet 1 are ornamental gratings or slots or openings arranged in ornamental style as shown at 6. Outer air is admitted through the gratings or openings at points opposite the base of the stove or heater 2 and also through the open bottom of shell 1. Preferably, the gratings or openings 6 are provided on both sides of the shell 1 and they are also provided at the back of said shell and, preferably, are those shown.

Above the doors 3 is an ornamental grating 7 which is sealed on the inside to prevent air from entering.

The top of the cabinet 1 has gratings 8 on all four of its sides. These gratings or slots not only enhance the appearance of the cabinet but they serve the purpose of affording thorough circulation for the heated air from the bottom and sides of the cabinet directly through all parts of the top thereof.

The invention is not limited to any particular stove or heater 2. The one shown is well adapted to serve the purposes of the invention. This stove has an ash box or pit 9, to which access is had on opening the door 5; the stove has a fire pot 10, and combustion chamber 11, the latter having the door 4 which, on being opened, permits of the introduction of fuel. The stove may have a dome-shaped heating chamber 12 and from this leads the flue connection 13. Dampers 14 and 15 are provided; these may be operated in any desired manner as, for instance, by chains 16 and 17.

The grate may be operated by a shaft and handle 18.

The extreme bottom 19 of the stove is provided with feet 20 which are removably seated on brackets or corner pieces 21 carried by the base frame which supports the shell 1 and screws or bolts 22 connecting the feet 20 to said base frame. On removing the screws or bolts 22, the stove or heater can be taken down and removed from the shell or casing; similarly, the foregoing simple manner of supporting the stove or heater enables the latter to be easily mounted inside of the shell or cabinet 1.

In the present stove or heater, the heater 2 is completely separated on all sides from the four walls of the cabinet or shell 1. In earlier stoves or heaters of this general class the heater has been separated but from three sides of the shell or cabinet, so far as I am aware. Consequently, in my heater there is an increase of twenty-five per cent in circulation of air, rendering the heater much more efficient than those heretofore known.

The stove or heater 2 is provided with small braces attached to its sides and front at its upper part to hold it in position in the cabinet or shell 1 and to prevent straining during shipment.

The inside of the shell or cabinet 1 is preferably lined with some heat insulating material, such as asbestos, to prevent the escape of too much heat through the sides thereof.

No bolts will appear on the outside of the shell 1, which will be finished in such a manner as to present the appearance of an attractive talking machine cabinet.

I claim:

1. A stove or heater comprising a rectangular horizontally arranged base frame provided with internal, inwardly projecting pieces or brackets at its corners, an outer shell or cabinet of rectangular cross sectional shape supported by said base frame, an inner stove or heater whose base has feet at its corners, said feet being supported on the aforesaid brackets, said stove or heater being solely sustained within the shell by said brackets and being wholly contained within and completely surrounded by said shell and separated from it on all of its sides by an air space, detachable connections being provided between the brackets and the feet on the bottom of the stove or heater, and said shell having openings in the lower parts of its sides and in its upper part to permit the passage of air upwardly between the walls of the shell and the heater.

2. A stove or heater comprising an outer shell or cabinet, a supporting base therefor having parts located within the shell, said shell or cabinet having openings in the lower parts of its sides and its upper part to permit the passage of air upwardly within the shell, a stove or heater wholly contained within said shell or casing and solely supported by the base part of said shell or casing, said stove or heater having fire pot and ash pit doors located wholly inside of the shell or casing, a single opening for said shell whereby access may be had to all of the aforesaid doors of the stove or heater, and a closure for said opening.

In testimony whereof I affix my signature.

EDWIN F. DIEKMANN.